United States Patent
Rachlin et al.

(10) Patent No.: US 6,298,457 B1
(45) Date of Patent: *Oct. 2, 2001

(54) NON-INVASIVE NETWORKED-BASED CUSTOMER SUPPORT

(75) Inventors: John N. Rachlin, Tarrytown; Rama Kalyani Tirumala Akkiraju, Ossining, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,110

(22) Filed: Oct. 17, 1997

(51) Int. Cl.[7] .................................................... H02H 3/05
(52) U.S. Cl. ............................... 714/49; 714/48; 714/12; 714/13; 714/15; 714/16; 714/17; 714/25; 714/26; 714/46; 714/47; 714/57; 714/28
(58) Field of Search .................................. 714/46–49, 25, 714/26, 13, 12, 17, 16, 15, 57, 28

(56) References Cited

U.S. PATENT DOCUMENTS

| | | | |
|---|---|---|---|
| 4,356,545 | * 10/1982 | West .................................... | 364/200 |
| 5,274,803 | * 12/1993 | Dubin et al. ........................ | 395/600 |
| 5,287,505 | * 2/1994 | Calvert et al. ...................... | 395/600 |
| 5,367,667 | * 11/1994 | Wahlquist et al. .................. | 395/575 |
| 5,563,946 | * 10/1996 | Cooper et al. .......................... | 380/4 |
| 5,737,726 | * 4/1998 | Cameron et al. ........................ | 705/7 |
| 5,768,523 | * 6/1998 | Schmidt ......................... | 395/200.54 |
| 5,862,322 | * 1/1999 | Anglin et al. .................... | 395/185.1 |
| 6,151,683 | * 11/2000 | Wookey ................................. | 714/2 |

* cited by examiner

Primary Examiner—Norman M. Wright
(74) Attorney, Agent, or Firm—McGuireWoods, LLP; Stephen C. Kaufman

(57) ABSTRACT

Customer-service tasks are performed in a noninvasive manner by relying on automatic methods for (a) capturing the state of the operating domain and (b) automatically communicating this state as well as a description of the circumstances that lead to activation of the process to a remote service machine via an electronic network. Network-based customer-service for software support includes an automatic mechanism which initiates the product support process. This automatic mechanism may optionally be augmented by a manual mechanism for initiating the support process. The process captures the operating environment in sufficient detail so as to enable its re-creation in part or in whole on a separate machine. Archived data is transmitted to an off-site storage device, and when this data is received, notification is transmitted to customer-support personnel. The operating environment is re-created, and the customer-support person investigates the problem by executing the software product in the re-created environment.

13 Claims, 5 Drawing Sheets

NON-INVASIVE NETWORKED-BASED CUSTOMER SUPPORT

BACKGROUND OF THE INVENTION

1. Field of the Invention

The present invention generally relates to software support mechanisms and, more particularly, to a computer implemented non-invasive networked-based customer-support method.

2. Background Description

The distribution of highly complex computer software necessitates more effective means of providing customer-support services. In some operating domains, the software provides a critical control function, the operation of which is highly dependent upon the current state of the operating domain. The user of such software may be, for example, a manufacturing facility where the software consists of scheduling applications designed to optimize and control the low-level operations of individual manufacturing devices. If the facility is remotely located, it may be more difficult to communicate information relevant to a particular problem to product support personnel. Existing methods for providing customer support have serious limitations. We discuss these briefly below:

a. Telephone Support

A user calls up a customer-support center and verbally describes the problem. The receiver may apply expertise (personal knowledge or reference to some database) to try to resolve the problem. This form of support is limited by virtue of its dependence on the user to effectively communicate a description of the problem as well as all relevant circumstances that may have created the problem. The advantage of this approach is that once contact with the customer support person is made, interaction is "real-time" in so far as it is possible to immediately respond to questions that arise either for the user or the product service technician.

b. Public Access to Problem Resolution Centers

A company may provide public access to some location whereby the user individually investigates the problem and attempts a resolution on their own. For example, many companies provide public access to a page on the World-Wide Web (WWW) with "knowledge bases" containing lists of frequently asked-questions. Such approaches to customer support are inexpensive but often fail to resolve problems resulting from rare contingencies or particulars of the operating environment.

c. Technical Service Visit

A company may provide personnel to visit a customer site in an attempt to resolve the problem on-site by performing a detailed investigation of the operating environment in which the product resides. This mode of customer service is expensive and still requires manual reconstruction of the state of the operating environment when the problem occurred.

d. Remote Terminal Display

In this mode of customer support, a network link to the user's monitor is made so that a customer-service personnel can see exactly what the user is seeing and even take over control of the terminal so as to perform diagnostic services. This approach may not reveal the underlying causes of a particular problem and may suffer from performance degradation due to limited network communication bandwidth.

All of these forms of customer support are invasive in that they require efforts on the part of the users of the software (their time and equipment, for example) to assist the customer-support technician. In continuous production environments, these types of support may thus be regarded as highly disruptive.

SUMMARY OF THE INVENTION

It is therefore an object of the present invention to perform customer-service tasks in a noninvasive manner by relying on automatic methods for (a) capturing the state of the operating domain and (b) automatically communicating this state as well as a description of the circumstances that lead to activation of the process to a remote service machine via an electronic network.

According to the invention, there is provided a network-based customer-service for software support in which an automatic mechanism initiates the product support process. This automatic mechanism may optionally be augmented by a manual mechanism for initiating the support process. The process captures the operating environment in sufficient detail so as to enable its re-creation in part or in whole on a separate machine. Archived data is transmitted to an off-site storage device, and when this data is received, notification is transmitted to customer-support personnel. The operating environment is re-created, and the customer-support person investigates the problem by executing the software product in the re-created environment.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

We consider as an example, and without loss of generality, a continuous process manufacturing environment in which the product, say a scheduling application, is executed by multiple users on a daily basis. The product, in this case, relies on background configuration data to perform its tasks and its output, whether correct or erroneous, depends upon this background data. If the system generates an erroneous or questionable result, it is readily possible, using well known techniques, to store or "archive" the state of the operating environment, including but not limited to this configuration data.

This archiving mechanism is very useful in that it now enables low-level debugging of the product code, but it has two limitations. First of all, it is possible for complex software products to produce erroneous results while failing to recognize that an error has actually occurred. This problem can be overcome be enabling users of the system to capture the state of the of the operating environment on demand. For example, a user interface might provide a menu option in which the user types in a description of a potential problem rather than relying upon the system to automatically detect the nature of the problem.

A second problem is to enable real-time support, for example while a user of the product is on the telephone, while still providing non-invasive customer-support. This requires that the files that capture the state of the operating environment be communicated to the customer support personnel and installed in a backup or simulation environment as quickly as possible, say less than 60 seconds for practical real-time support.

Figure 1:
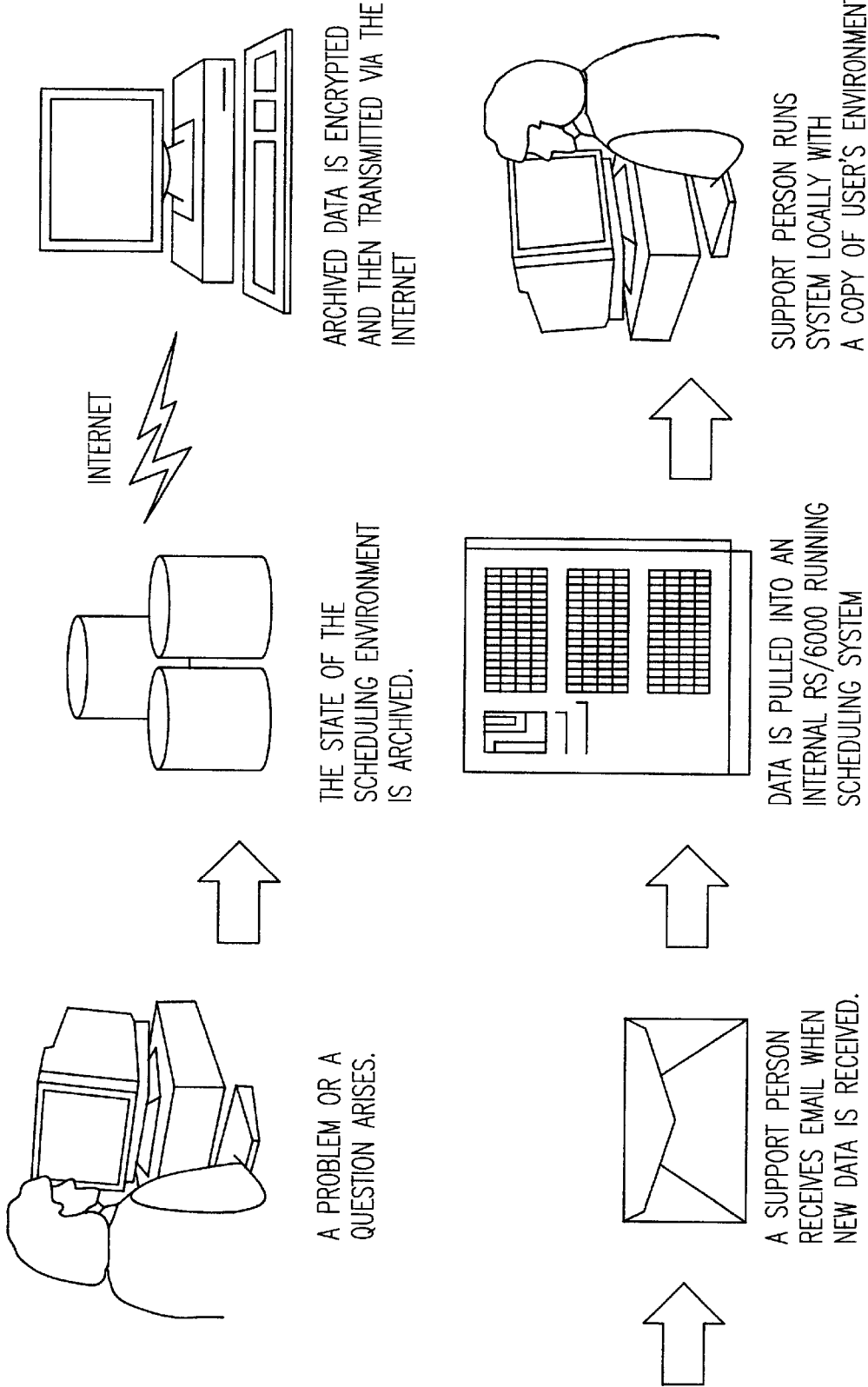
FIG. 1 is a diagram illustrating the operation of the non-invasive networked-based customer support process according to the present invention.

Referring now to the drawings, and more particularly to FIG. 1, there is shown the process of network-based customer support as generally described above and described in more detail below. In the first step of the process, an archive process is initiated automatically as the result of an output code generated by the supported product. Optionally, the process may also be initiated manually by the user if a question of the operation of the software arises during its execution.

As a result of the initiation of the process, an error handler archives the current state of the environment including the user's working environment as well as any input/output data that influences the control of the product in operation or provides insight into its past invocations. The operating environment stored by the error handler includes at least one or more of configuration data, execution logs, memory dumps, standard product outputs, date and time information. The error handler establishes network connection to an archive storage machine operated by product support personnel. The data archives and other tracking information are encrypted and then transmitted to the archive storage machine using some network communication protocol such as FTP (File Transfer Protocol).

A daemon process running at all times on the archive storage machine automatically detects when it receives new data archives, and sends notification via, for example, electronic mail (e-mail) to support personnel. A support person executes a command to install archived data onto a machine running some or all of the product components. This machine may be, for example, an IBM RS/6000 workstation running the customer's scheduling system. Alternatively, the process may be implemented to run on a 16-WAY IBM SP2 machine with AFS for storage. The SP2 is a collection IBM RS6000 engines running under a common umbrella and the AIX operating system (IBM's version of the UNIX operating system) and connected with a high speed switch. It could also be implemented on other hardware platforms including, but not limited to, mini computers, stand alone UNIX or Windows NT workstations, or workstations in a network, or mainframes, including IBM AS400 and ES9000 computers.

The support person now runs the product in a simulated environment and is thus able to recreate the circumstances by which the origin error process became initiated.

This process enhances customer service in five ways. First, it reduces response time since recreation of the state of the environment running at a remote location is now reduced to typing no more than a few commands at a computer console. Second, it enables product support for issues not necessarily detected as an error by the product components because users can optionally initiate the archive process at any time. Third, this process allows errors that are occurring at remote locations to be tracked over time because archived data can be automatically catalogued. Fourth, it enables real-time product support in so far as data can be transmitted rapidly via an electronic network such as the Internet. And fifth, the process is non-invasive in that it at no time requires that product support personnel interfere with a customer's application machine which may be responsible for performing and/or controlling mission critical operations on an on-going basis.

Figure 2:
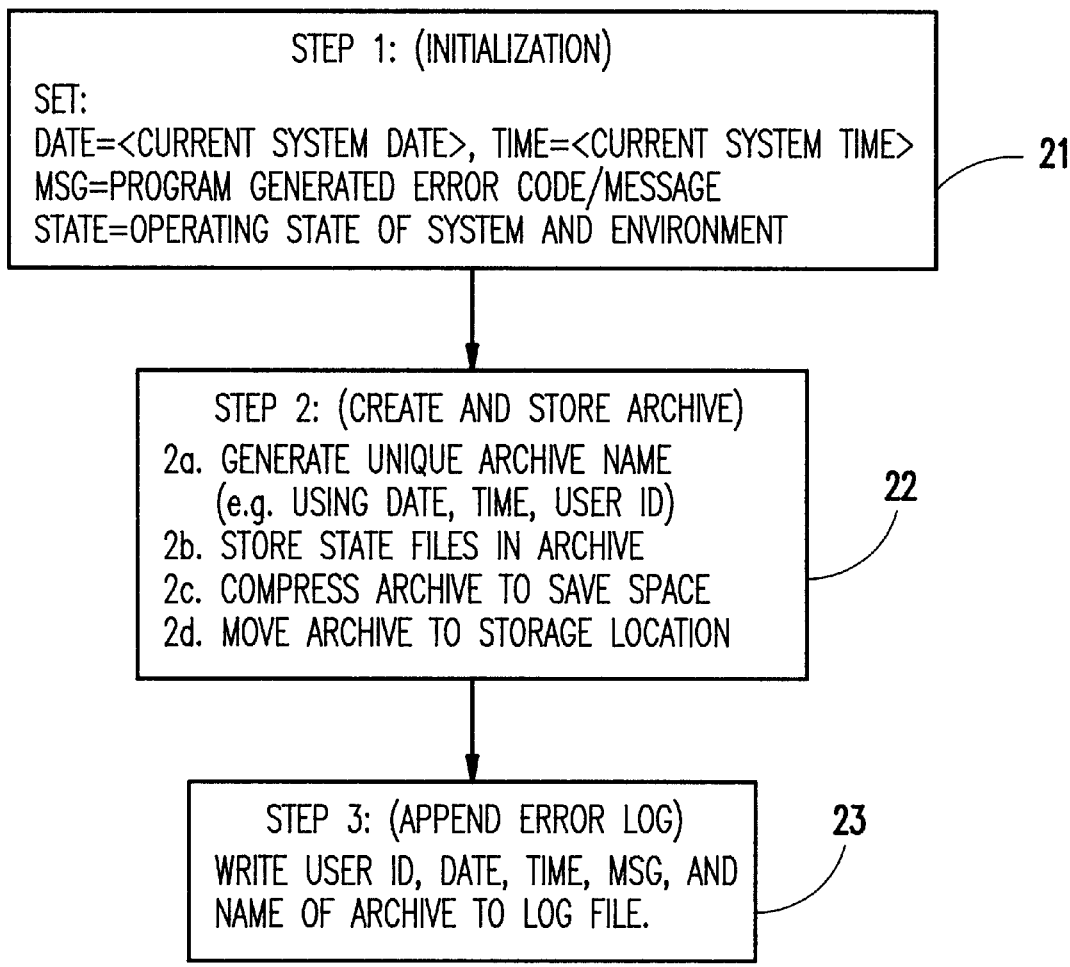
FIG. 2 is a flow diagram showing the logic of the error handler algorithm implemented by the present invention.

The error handler algorithm implemented according to the invention is shown in flow diagram form in FIG. 2. The first step in the process, represented by function block 21, is system initialization. this includes setting date and time, setting "Msg" to a program generated error code/message, and setting "State" to the operating state of the system and environment. The second step in function block 22 creates and stores an archive. This step is composed of several sub-steps beginning with generating a unique archive name. State files are stored in the archive, and the archive is compressed to save space. Finally, the archive is moved to a storage location. The third step in the error handler algorithm, as shown in function block 23, is to append an error log. This is done by writing the user identification (ID), date, time, "Msg" and name of archive to the log file.

Figure 3:
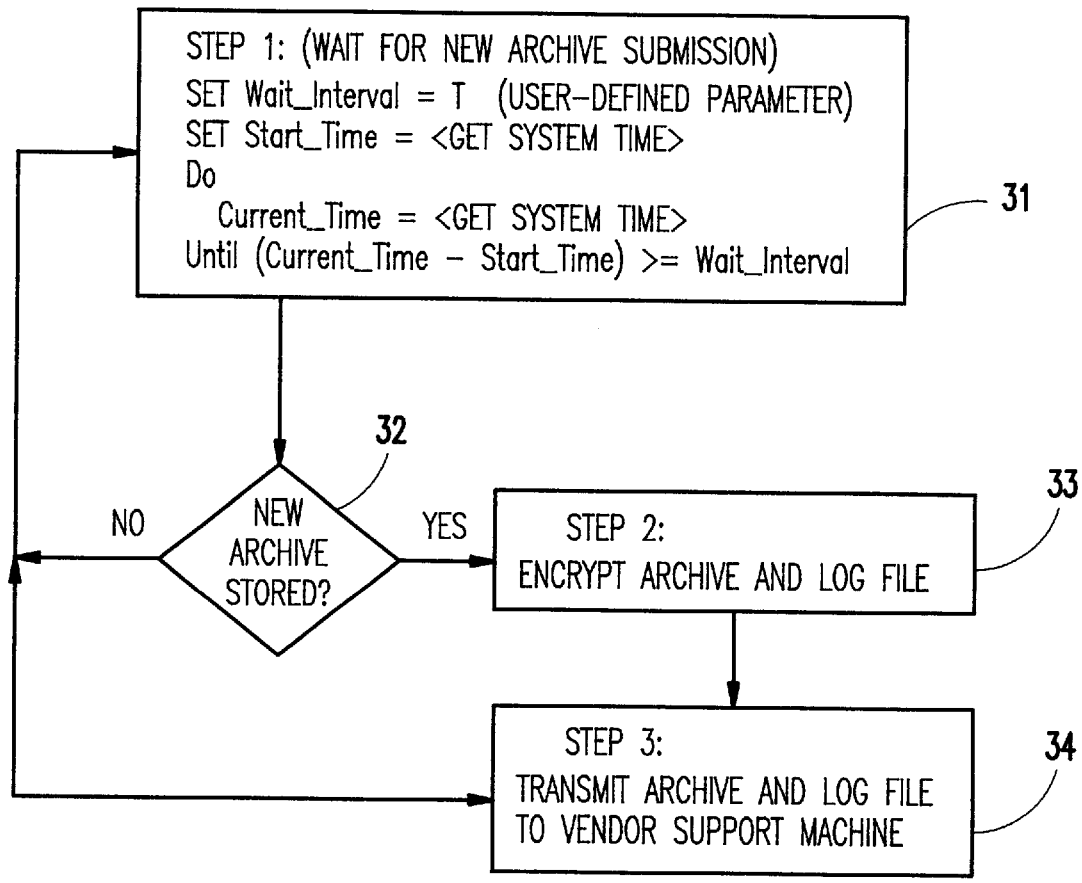
FIG. 3 is a flow diagram showing the logic of the archive transmit daemon algorithm implemented by the present invention.

The flow diagram for the archive transmit daemon algorithm is shown in FIG. 3. The first step in function block 31 is to await a new archive submission. Inputs to this function are a user-defined parameter called "Wait_Interval" and the system time, "Start_Time". The current time is set to the system time, and a test is made to detect when the current time less the start time equals the user-defined wait interval. At that time, a test is made in decision block 32 to determine if a new archive has been stored. If not, the process loops back to function block 31 to reset the start time for the next wait interval. Upon receiving an archive submission, the archive is encrypted and the error log is appended to the file in function block 33. Encryption is necessary to insure the security of the customer's data in the event of its being intercepted en route to the customer support facility. Next, in function block 34, the archive and the error log is transmitted to the vendor support machine. This done, the process again loops back to function block 31 to reset the start time for the next wait interval.

Figure 4:
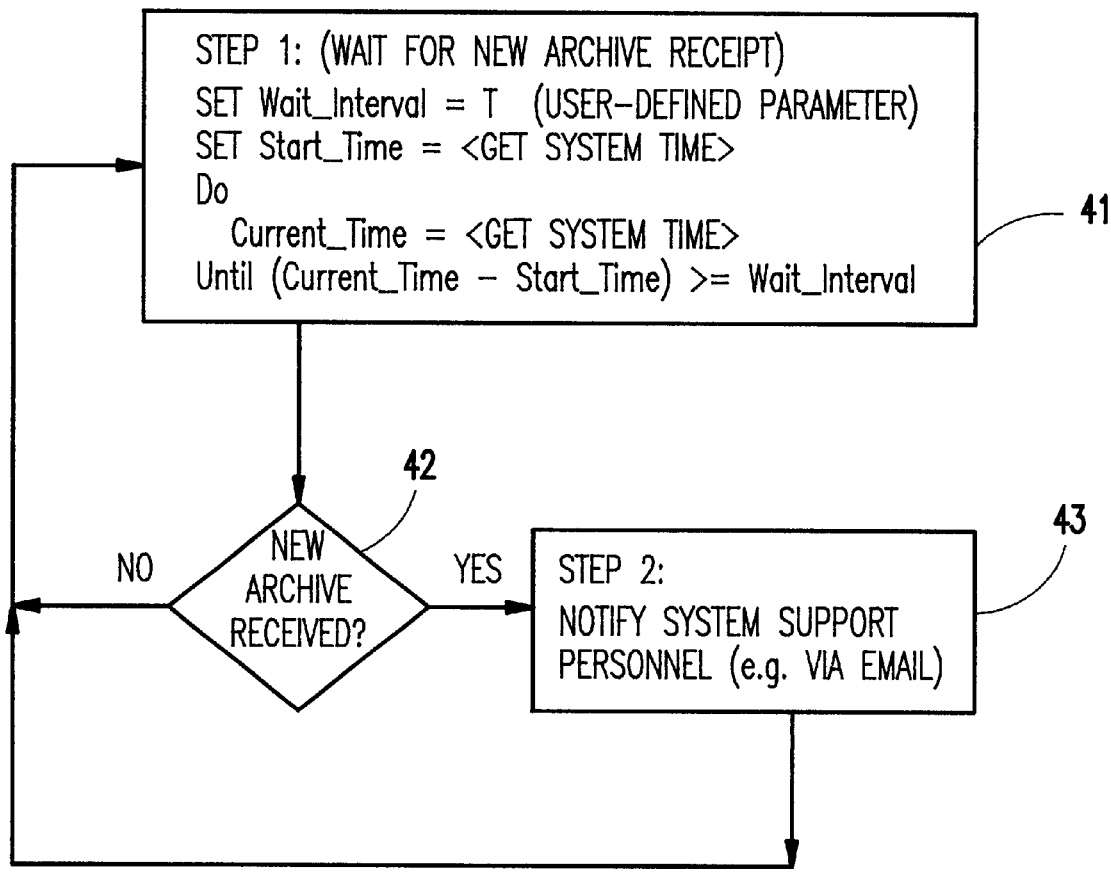
FIG. 4 is a flow diagram showing the logic of the archive receive daemon algorithm implemented by the present invention.

The flow diagram for the archive receive daemon algorithm is shown in FIG. 4. The logic of this process is similar to that of transmit daemon shown in FIG. 3. More particularly, the first step in function block 41 is to await a new archive receipt. Inputs to this function are a user-defined parameter called "Wait_Interval" and the system time, "Start_Time". The current time is set to the system time, and a test is made to detect when the current time less the start time equals the user-defined wait interval. At that time, a test is made in decision block 42 to determine if a new archive has been received. If not, the process loops back to function block 41 to reset the start time for the next wait interval. Upon receiving an archive, system support personnel are notified in function block 43. This notification may be, for example, by electronic mail (e-mail).

Figure 5:
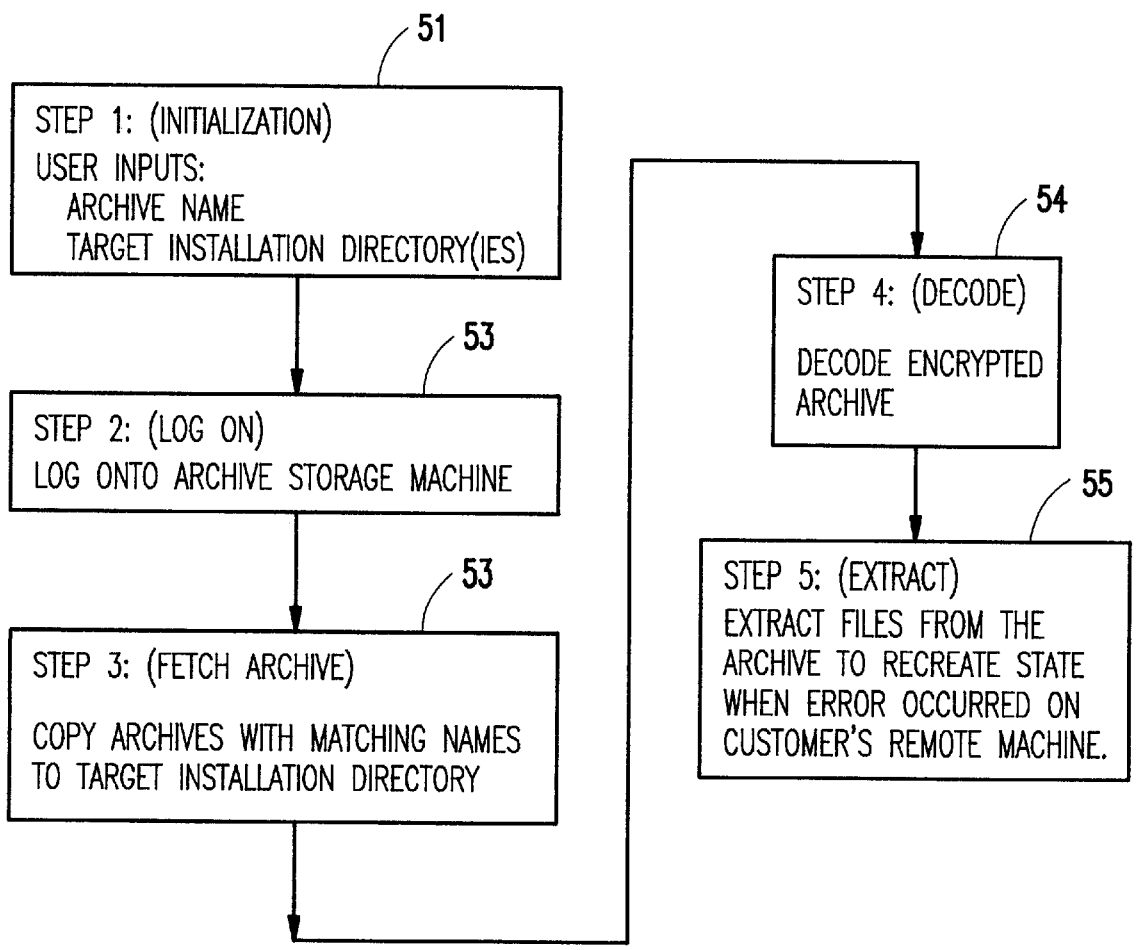
FIG. 5 is a flow diagram showing the logic of the archive fetch algorithm implemented by the present invention.

The archive fetch algorithm flow diagram is shown in FIG. 5. The process begins with an initialization step in function block 51 in which the user inputs an archive name and target installation directory(ies). In function block 52, the system logs onto the archive storage machine. The archive is fetched in function block 53 by copying archives with matching names and target installation directory. Since the fetched archive is encrypted (function block 33 in FIG. 3), the fetched archive is decoded in function block 54. The plain text file is output to function block 55 where the files are extracted from the archive to recreate the state where the error occurred on the customer's remote machine.

An Example Implementation

In this section we present, without loss of generality, an example implementation of the technology sufficient to enable one skilled in the practice of computer programming to create a working version of the system.

It is standard software design to enable software components to output a code corresponding to their execution state. A component may be readily programmed to output a unique code corresponding to the particular system failure that has occurred. In complex domains, this single code may not be sufficient to fully identify the underlying causes by which an error code was generated. It may require detailed examination of the underlying support data, or re-execution of the software component in a "debugging mode" in which the execution of each line of code can be explicitly monitored by product support personnel.

If a product generates an error, the error handling process shown in FIG. 2 is invoked which is responsible for capturing the state of the user's working environment as well as the state of the configuration data upon which the product depends. For example, a user called "jane" is executing the product in a working environment (operating system directory) called "mydir" when a problem occurs. In this example, two files could he generated:

data-Nov25-15:15.taz—the configuration data, archived on November 25, 3:15pm jane-mydir-Nov2S-15:15.taz—the working directory "mydir" for user "jane", archived on the same date Here, the name of the files identifies the date and time of the archive occurrence, the user associated with the initiation of the archive process and the name of that user's working environment. The ".taz" file name extension is indicative of the electronic compression of the data so as to minimize archive storage space utilization.

These two files are intended to capture fully the state of the operating environment for purposes of this example. This invention does not dictate what particular electronic files or transactions may be necessary to achieve this capturing of the operating state. In addition, the system may, without loss of generality, provide tracking information summarizing all errors that occur. For example, this might involve appending a one-line summary of the error occurrence to a file: /product/archives/error.log. This entry identifies the user, when the problem occurred, and which component of the product generated the error. The following is a sample error.log entry:

Mon Nov 25 15:15:53 EST 1996 jane mydir E1023: Component XYZ failure

This says that on Monday, November 25$^{th}$, at 3:15pm, the user "jane" was working in her "mydir" directory when component XYZ of the product failed, generating an error code "E1023." The logging of these errors provide a mechanism for tracking the occurrence of errors over time. Additional information may also be included in this log, if desired.

The process shown in FIG. 3 shows the preferred implementation of the transmit algorithm that runs continuously on the customer's remote environment. We refer to such continually running algorithms as "daemon" processes. This daemon process is responsible for detecting that a new archive has been created and stored. When detection occurs, the daemon process transmits the archive to a remote machine accessible by customer-support personnel. Establishing a remote connection to the archive storage machine followed by encryption and transmission of the archived data can be performed using a standard scripting language.

The daemon process running on the archive storage machine is shown in FIG. 4. This process is responsible for detecting the arrival of new archived data from the customer, and for notifying support personnel of its arrival. One mechanism for doing this is for the daemon process to monitor the contents of this receiving directory and to determine at periodic intervals whether the content of this receiving directory has changed. The daemon process can then be easily programmed to issue a command to transmit a message (via electronic mail, for example) to the appropriate service personnel.

When the support person receives electronic mail from the daemon process, he or she might issue one of the following commands:

a. fetchlog retrieves the log file only, decrypts, it, and displays its content. This command summarizes the problems that have occurred.

b. fetchdata <string> <workingdir> retrieves data files whose filename contains the substring "string" (this could be the unique date and time stamp of the archived data, for example). The data is automatically decrypted and copied to an appropriate location so as to be accessible by a backup simulation machine.

c. fetchlast retrieves that most recently uploaded archives and installs them as before.

FIG. 5 shows the preferred implementation of the archive fetch algorithm.

While the invention has been described in terms of a single preferred embodiment, those skilled in the art will recognize that the invention can be practiced with modification within the spirit and scope of the appended claims. For example, the process may be optionally augmented by a manual mechanism for initiating the customer support process. This would be facilitated by a user interface that enables a user of the software product to initiate the customer support process manually.

What is claimed is:

1. A computer implemented method for performing customer-service tasks on a software product in a noninvasive manner comprising the steps of:

monitoring operation of the software product on a customer's machine for errors;

automatically initiating a product support process upon detection of an error by transmitting to an off-site storage device operating environment information stored by the error handler related to the detected error, wherein the operating environment information has sufficiently detail to enable re-creation of the operating environment in part or in whole on a separate machine;

detecting at the off-site storage device when information related to a detected error from a customer's machine is received;

notifying customer-support personnel of the receipt of the operating environment information related to a detected error from a customer's machine;

loading the received information related to a detected error from a customer's machine on the separate machine; and re-creating the operating environment on the separate machine using the operating environment information so that the customer-support personnel may investigate the problem by simulating the operating environment and executing the software product in the re-created environment in real time.

2. The computer implemented method recited in claim 1 wherein the step of automatically initiating a product support process upon detection of an error comprises the steps of:

capturing data of an operating environment of the software product in sufficient detail so as to enable its re-creation in part or in whole on a separate machine; and archiving the captured data, the archived data being transmitted to the off-site storage device attached to a separate machine.

3. The computer implemented method recited in claim 2 further comprising encrypting the archived data prior to transmitting to the off-site storage device.

4. The computer implemented method recited in claim 1 wherein the step of automatically initiating the product support process may optionally be augmented by a manual mechanism for initiating the support process.

5. The computer implemented method recited in claim 4 further comprising the step of generating a user interface that enables a user of the software product to initiate the process manually.

6. The computer implemented method recited in claim 1 wherein the step of monitoring is performed by detecting one or more error codes by one or more software product components.

7. The computer implemented method recited in claim 6 further comprising the step of invoking an error handler upon the detection of an error code, the error handler generating an error log which forms part of the information related to the detected error.

8. The computer implemented method recited in claim 1 further comprising the step of encrypting information related to the detected error prior to transmitting the information related to the detected error to the off-site storage device.

9. The computer implemented method recited in claim 1 wherein the information related to the detected error specifies an operating environment including at least one of configuration data, execution logs, memory dumps, standard product outputs, date and time information.

10. A computer implemented method for performing customer-service tasks on a software product in a noninvasive manner comprising the steps of:

monitoring operation of the software product on a customer's machine and detecting one or more error codes by one or more software components;

invoking an error handler upon the detection of an error code, the error handler generating an error log;

capturing data of an operating environment of the software product in sufficient detail so as to enable its re-creation in part or in whole on a separate machine;

archiving the captured data and the error log;

transmitting the archived data and error log to the off-site storage device attached to a separate machine;

detecting at the off-site storage device when the transmitted data related to a detected error from a customer's machine is received;

notifying customer-support personnel of the receipt of the transmitted data related to a detected error from a customer's machine;

loading the received data related to a detected error from a customer's machine on the separate machine; and re-creating the operating environment on the separate machine using the received data so that the customer-support personnel may investigate the problem by simulating the operating environment and executing the software product in the re-created environment in real time.

11. The computer implemented method recited in claim 10 wherein the information related to the detected error specifies an operating environment including at least one of configuration data, execution logs, memory dumps, standard product outputs, date and time information.

12. A computer implemented method as recited in claim 1, wherein said operating environment information comprises configuration data, execution logs, memory dumps, standard product outputs, and date and time information.

13. A computer implemented method as recited in claim 10, wherein the captured data is operating environment information comprising configuration data, execution logs, memory dumps, standard product outputs, and date and time information.

* * * * *